(12) United States Patent
Okada

(10) Patent No.: US 6,618,121 B2
(45) Date of Patent: Sep. 9, 2003

(54) STAGE APPARATUS CAPABLE OF SUPPRESSING ROLLING OF A VIBRATION ISOLATION TABLE

(75) Inventor: Naobumi Okada, Asaka (JP)

(73) Assignee: Olympus Optical Co., Ltd., Tokyo (JP)

(*) Notice: Subject to any disclaimer, the term of this patent is extended or adjusted under 35 U.S.C. 154(b) by 0 days.

(21) Appl. No.: 10/103,215

(22) Filed: Mar. 20, 2002

(65) Prior Publication Data

US 2002/0100853 A1 Aug. 1, 2002

Related U.S. Application Data

(63) Continuation of application No. PCT/JP00/06474, filed on Sep. 21, 2000.

(30) Foreign Application Priority Data

Sep. 22, 1999 (JP) ............................................. 11-268758

(51) Int. Cl.[7] ...................... G03B 27/58; G03B 27/42; G03B 27/62; G03B 5/01
(52) U.S. Cl. ........................... 355/72; 355/53; 355/75; 318/611

(58) Field of Search ............................... 355/72, 53, 75; 248/550; 318/611, 460

(56) References Cited

FOREIGN PATENT DOCUMENTS

| JP | 59-182524 A | 10/1984 |
|----|-------------|---------|
| JP | 63-63988 A | 3/1988 |
| JP | 07-307279 A | 11/1995 |
| JP | 08-111374 A | 4/1996 |
| JP | 10-144601 A | 5/1998 |
| JP | 11-143547 A | 5/1999 |

*Primary Examiner*—Russell Adams
*Assistant Examiner*—Peter B. Kim
(74) *Attorney, Agent, or Firm*—Frishauf, Holtz, Goodman & Chick, P.C.

(57) ABSTRACT

With a simple operation of inputting the target movement amount for the stage through the input device as input data, an acceleration signal is output from the control device to the acceleration/deceleration device based on the input data, and then n×T seconds after the acceleration signal is output, a deceleration signal having the same waveform as that of the acceleration signal and an opposite direction thereto is output.

7 Claims, 8 Drawing Sheets

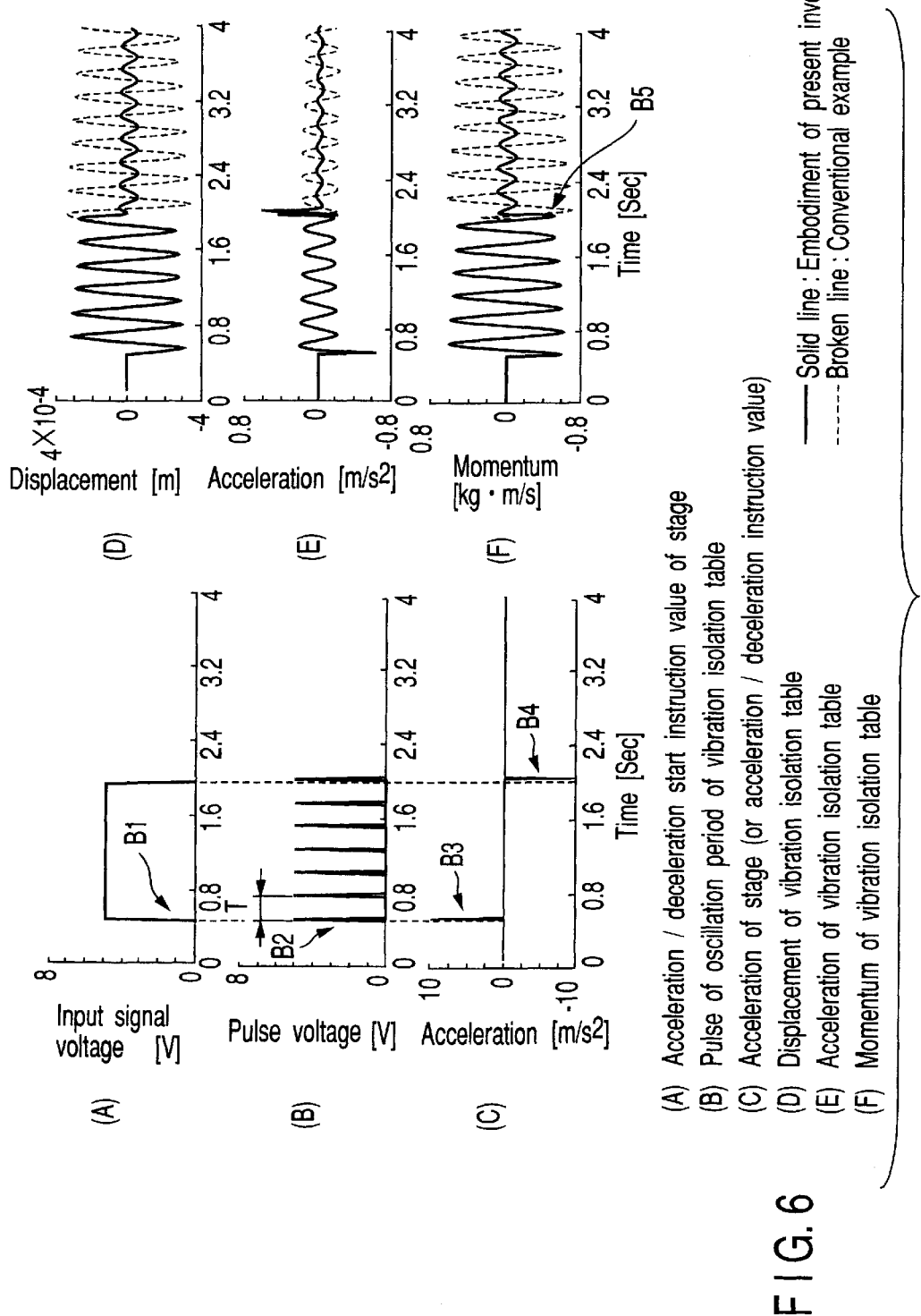

FIG. 6

(A) Acceleration / deceleration start instruction value of stage
(B) Pulse of oscillation period of vibration isolation table
(C) Acceleration of stage (or acceleration / deceleration instruction value)
(D) Displacement of vibration isolation table
(E) Acceleration of vibration isolation table
(F) Momentum of vibration isolation table —— Solid line : Embodiment of present invention
----- Broken line : Conventional example

STAGE APPARATUS CAPABLE OF SUPPRESSING ROLLING OF A VIBRATION ISOLATION TABLE

CROSS REFERENCE TO RELATED APPLICATIONS

This is a Continuation Application of PCT Application No. PCT/JP00/06474, filed Sep. 21, 2000, which was not published under PCT Article 21(2) in English.

This application is based upon and claims the benefit of priority from the prior Japanese Patent Application No. 11-268758, filed Sep. 22, 1999, the entire contents of which are incorporated herein by reference.

BACKGROUND OF THE INVENTION

1. Field of the Invention

The present invention relates to a stage apparatus used on a vibration isolation table.

2. Description of the Related Art

Conventionally, in order to inspect a defect of a glass substrate of a flat panel display (FPD), a typical example of which is a liquid crystal display, a glass substrate to be inspected is placed on a stage which can be moved in two axial directions of XY. Then, while moving the stage, the surface of the glass substrate is magnified using a microscope or the like, and a defect is observed.

FIG. 11 is a structural diagram showing an example of a stage apparatus used for a defect inspection such as described above. In this apparatus, a vibration isolation table 3 having an air spring 3a and a surface plate 3b is placed on two or four support table 1. On the vibration isolation table 3, a stage 4 designed to be movable in two axial directions of XY, which cross orthogonally is mounted, and an object 5 to be examined, such as a glass substrate is to be placed on this stage 4. Further, a microscope 7 is supported on the vibration isolation table 3 by means of an arm-shaped frame 6 such that the microscope 7 is situated above the to-be-examined object 5 placed on the stage 4. With this structure, while adjusting the relative position of the object 5 with respect to the microscope 7 by moving the stage 4 in the XY directions, the surface of the object 5 can be observed with a magnified view thereof.

In the case of this structure, the stage 4 is moved in the two axial direction of XY via a ball spring 10 by means of an acceleration/deceleration device 9 such as a servo motor controlled by a control apparatus 8. Here, in the case where a servo motor is used as the acceleration/deceleration device 9, a target moving amount and a target speed are input using an input device 11, and then the input device 11 outputs the target moving amount and the target speed to the control device 8. Thus, control signals for the target moving amount and the target speed are output from the control device 8 to the acceleration/deceleration device 9, and thus the stage 4 is moved accordingly.

It should be noted here that in the case where the stage 4 is controlled full-automatically, a device which has been programmed for the motion of the stage 4 in advance, such as a computer, can be used in place of the input device 11. Further, in some cases, while the user of the apparatus monitoring an observation image taken by the microscope 7, the stage 4 is controlled manually with use of an input device such as a joystick or button switch (to be referred to as button hereinafter).

However, such a stage apparatus entails a problem that the vibration isolation table 3 is rolled due to a stress created by acceleration and deceleration of the stage 4 when it is moved by the acceleration/deceleration device 9. The stage 4 is supported on the support table 1 via the vibration isolation table 3 so that the vibration from the floor cannot be propagated to the stage 4. However, the vibration isolation table 3 has a structure in which the surface plate 3b is elastically supported by the air spring 3a. With this structure, when the acceleration/deceleration of the stage 4 is repeated on the vibration isolation stage 3, the surface plate 3b elastically supported by the air spring 3a is rolled due to a stress created each time the stage is accelerated or decelerated. When the rolling of the surface plate 3b is large, the rolling is propagated to the frame 6 which supports the microscope 7 on the surface plate 3b. This oscillation may cause a blurring of microscopic observation image.

Under these circumstances, conventionally, as a countermeasure for the rolling of the vibration isolation table, such an apparatus as disclosed in, for example, Jpn. Pat. Appln. KOKAI Publication No. 7-307279 is considered. This apparatus uses an active vibration isolation table, and a surface plate of this vibration isolation table is controlled with use of an actuator, in order to suppress the rolling. However, with such a means, an actuator for controlling the surface plate and a control system for the actuator are required. Therefore, the structure of the apparatus becomes complex and the production cost of the apparatus becomes high, which are not desirable.

Further, Jpn. Pat. Appln. KOKAI Publication No. 8-111374 proposes other apparatus as a countermeasure different from the above. This apparatus takes such a structure that the stress due to the acceleration or deceleration of the stage is not propagated to the vibration isolation table. That is, in this apparatus, the frame on which the acceleration/deceleration driving device for the stage is mounted is prepared as a separate member from the vibration isolation table and fixed to the floor. With this structure, the stress created while acceleration or deceleration is added only to the frame not to the vibration isolation table, and thus the rolling of the vibration isolation caused by the stress creating while acceleration or deceleration is prevented. However, with such a means, an acceleration/deceleration driving device for the stage is required. Therefore, the structure of the apparatus becomes complex and the production cost of the apparatus becomes high. Further, the contact area of the apparatus with respect to the floor becomes larger, which is not desirable.

Further, Jpn. Pat. Appln. KOKAI Publication No. 10-144601 proposes other apparatus as a countermeasure different from the above. This apparatus takes such a structure that the rolling of the vibration isolation table is suppressed with use of an order value for the acceleration/deceleration of the stage, which has been obtained by a simulation. However, with such a countermeasure, the order value is so complicated that it is not suitable for the movement of the stage having such a long stroke which, requires a time period several times larger than the rolling period of the vibration isolation table, thus creating a problem.

Therefore, the object of the present invention is to provide a stage apparatus which can effectively suppress the rolling of the vibration isolation table, caused by the stress created while accelerating or decelerating the stage.

BRIEF SUMMARY OF THE INVENTION

According to the present invention, there is provided a stage apparatus including a stage mounted on a vibration isolation table, comprising: a drive unit which accelerates or decelerates the stage; an input unit which accepts a start signal of acceleration/deceleration as input data without defining a target movement amount for the stage; and a control unit which outputs an acceleration signal to the drive unit based on the data for the start of the acceleration input to the input unit and outputs, n×T seconds after the acceleration signal is output after the data for the start of deceleration is input to the input unit, and (where n represents a natural number and T represents a rolling oscillation period unique to the vibration isolation table [in seconds]), a deceleration signal having a same waveform as that of the acceleration signal and an opposite direction thereto.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

BRIEF DESCRIPTION OF THE SEVERAL VIEWS OF THE DRAWING

Figure 1:
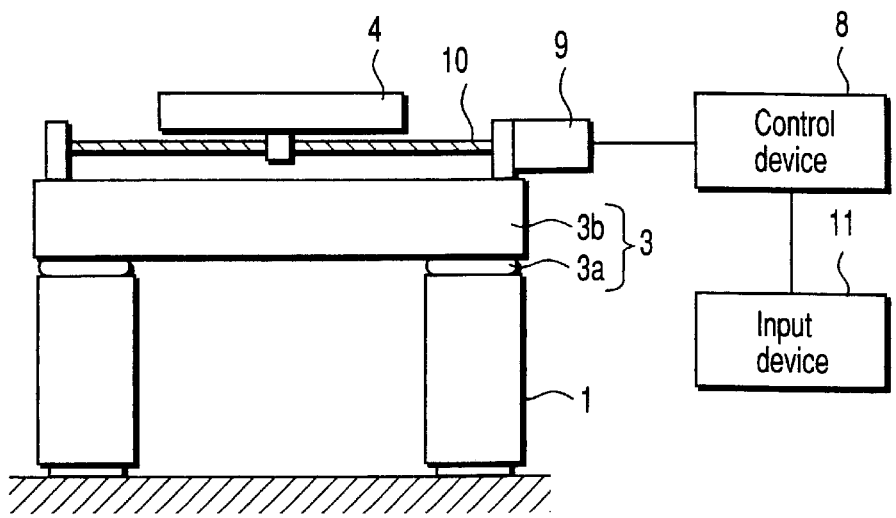
Figure 2:
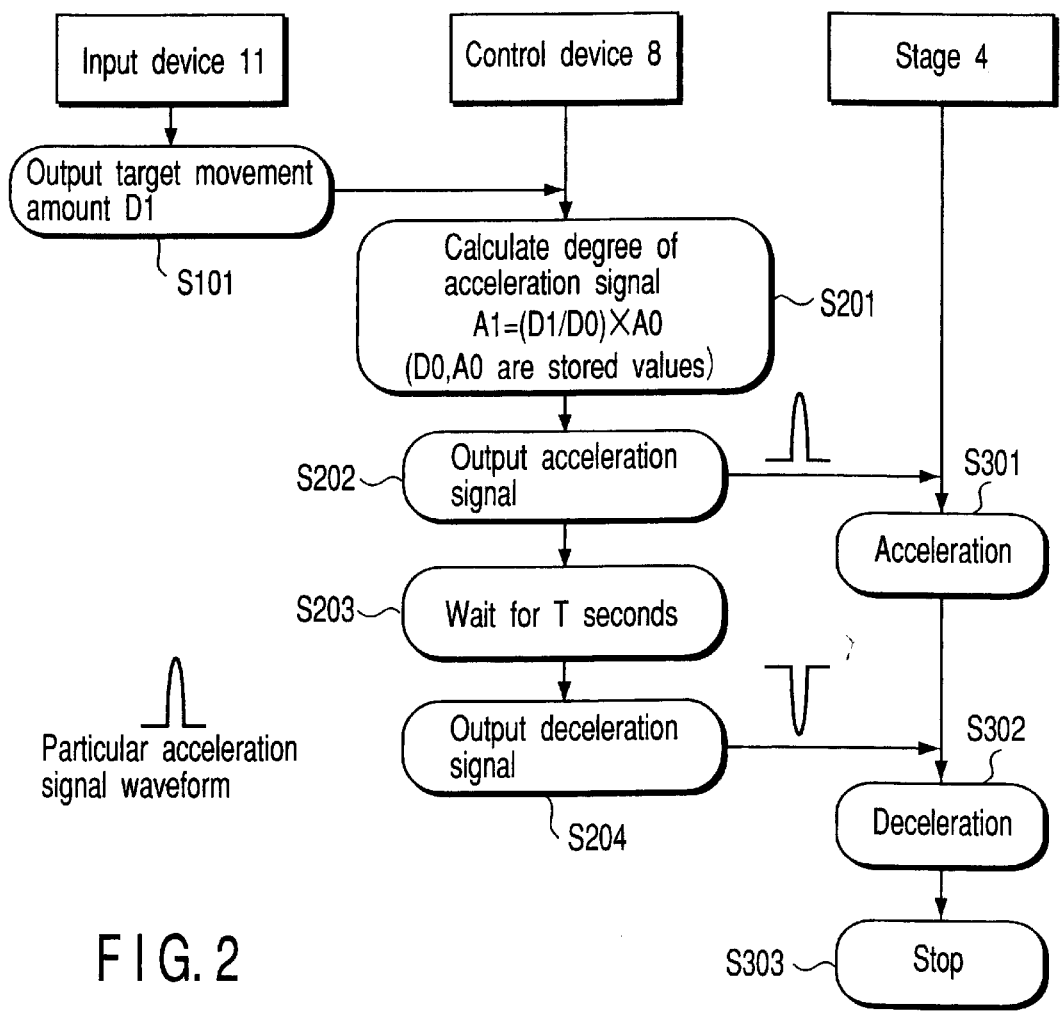
Figure 3:
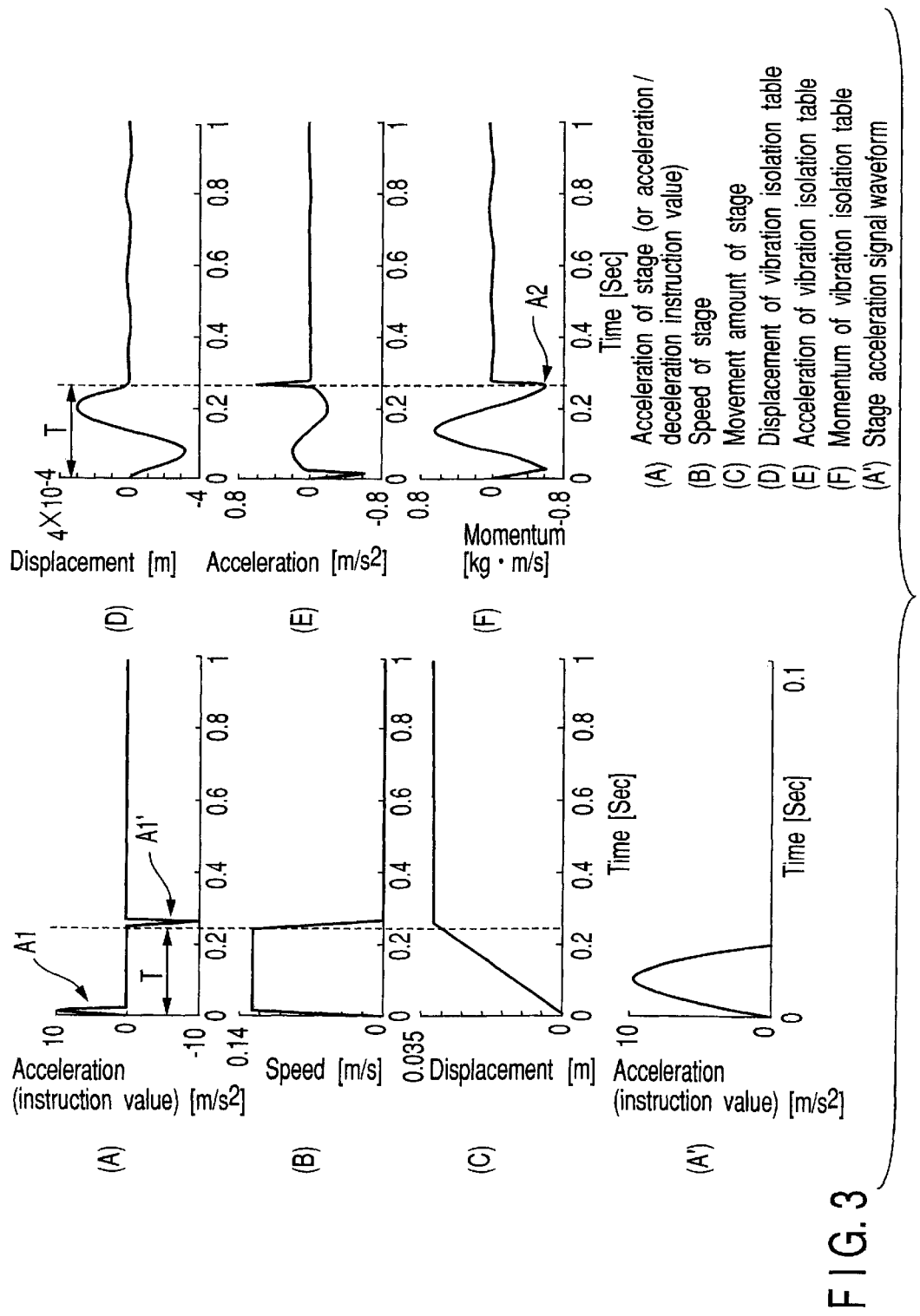
Figure 4:
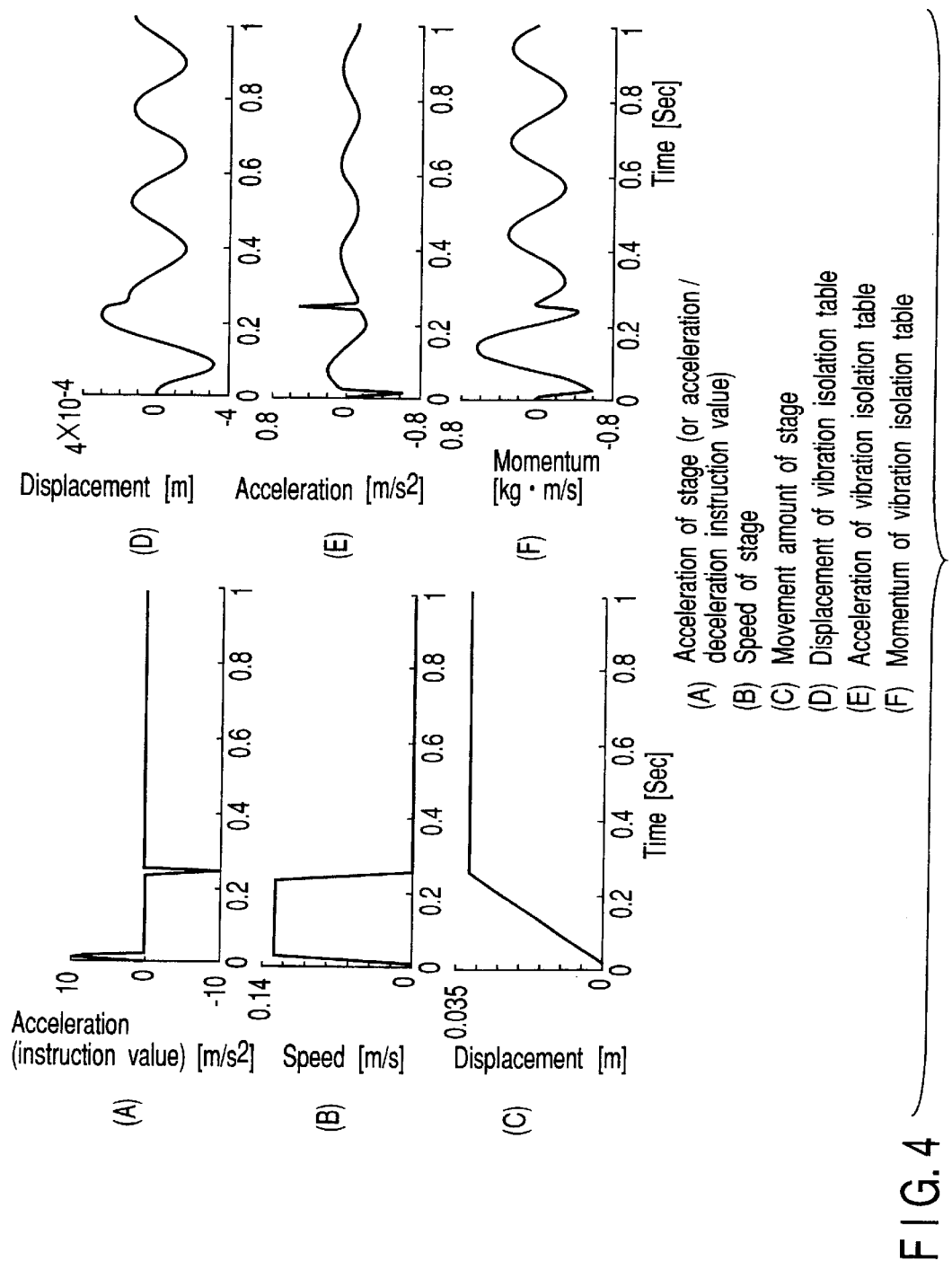
Figure 5:
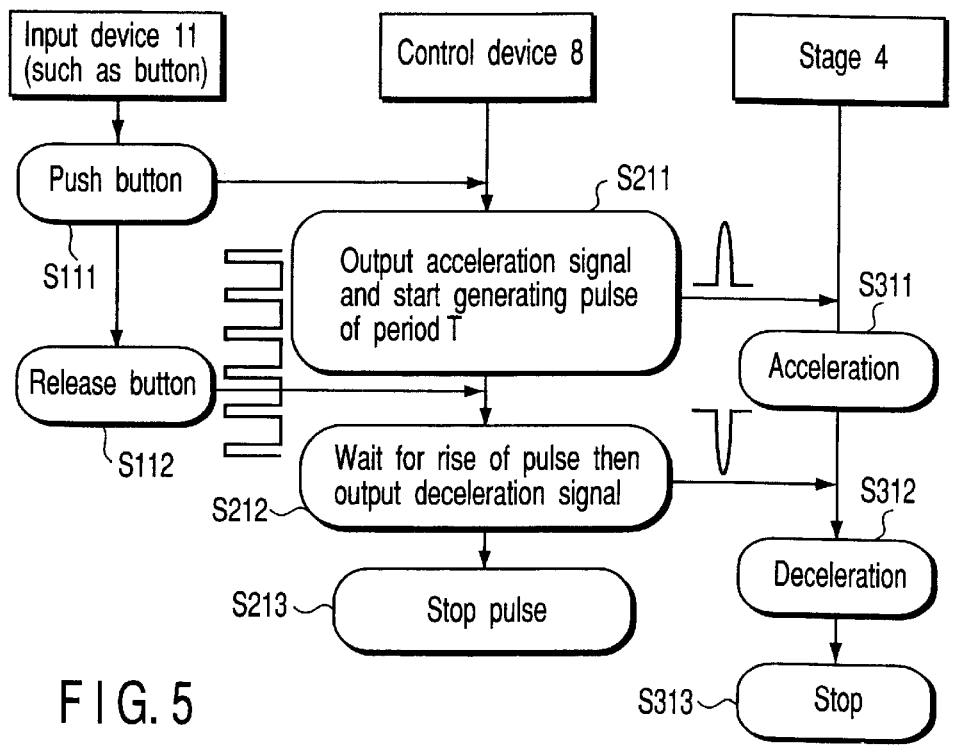
Figure 7:
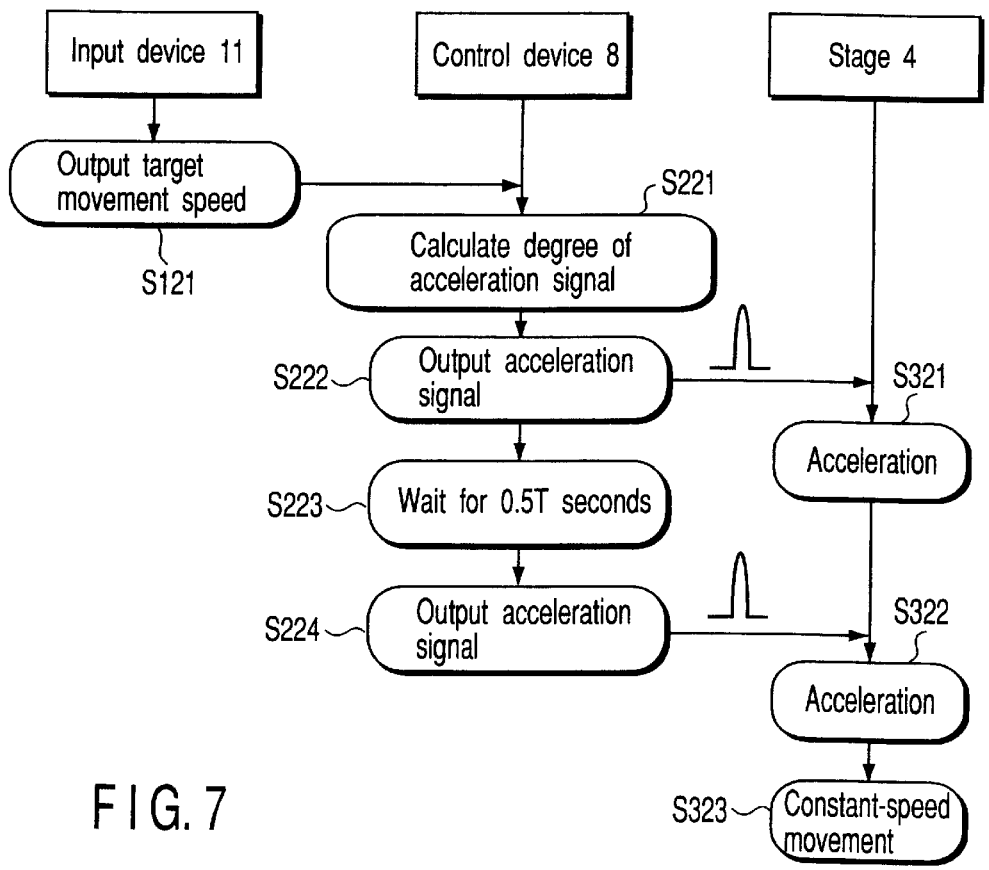
Figure 8:
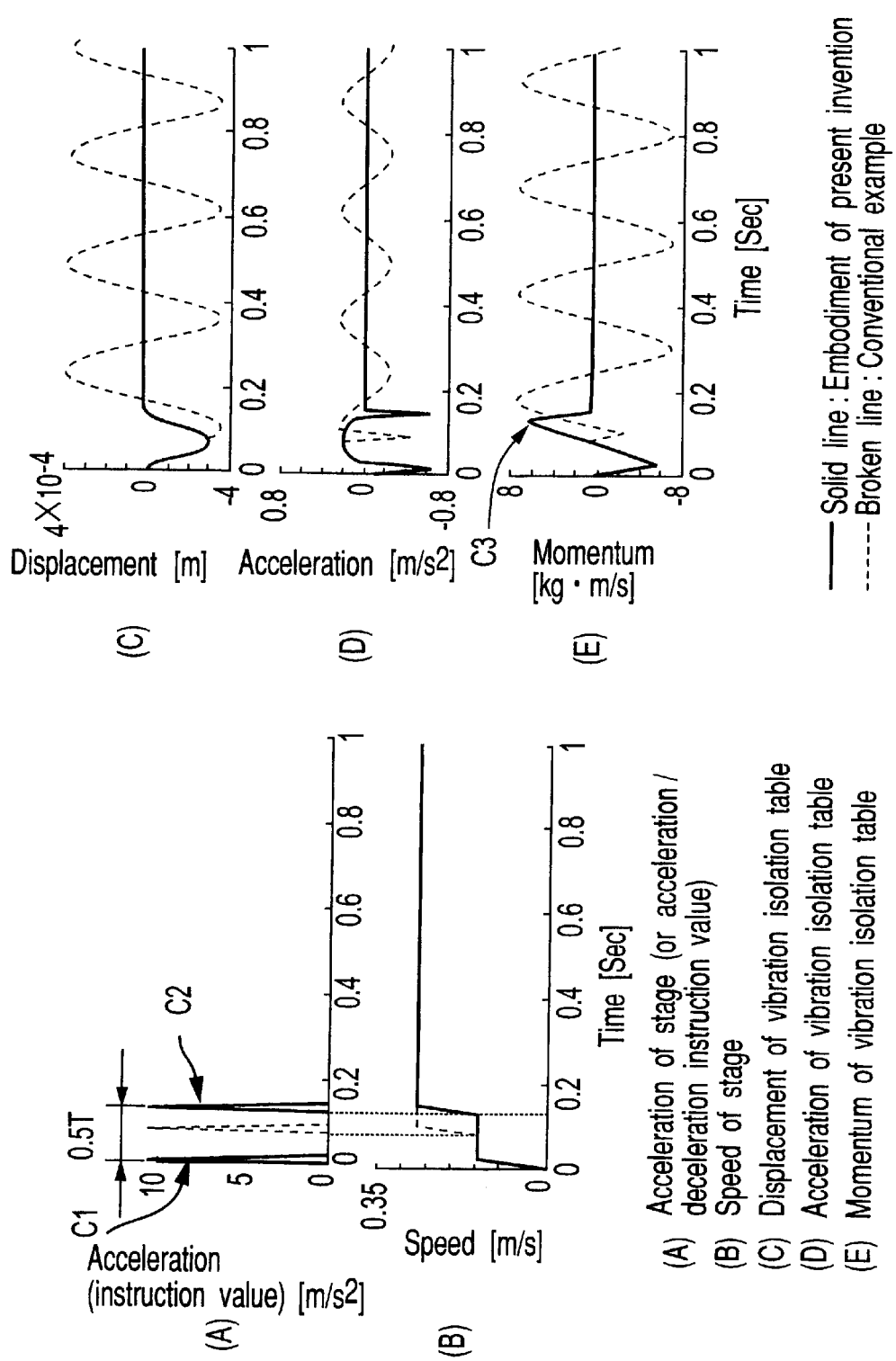
Figure 9:
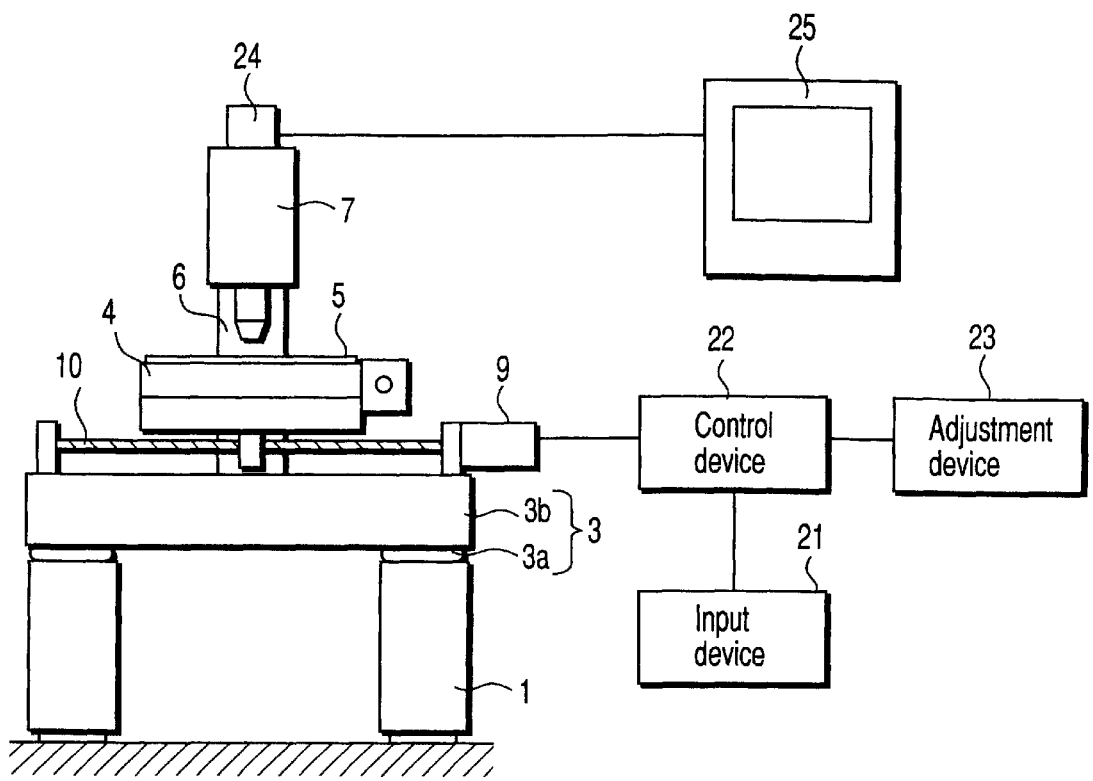
Figure 10:
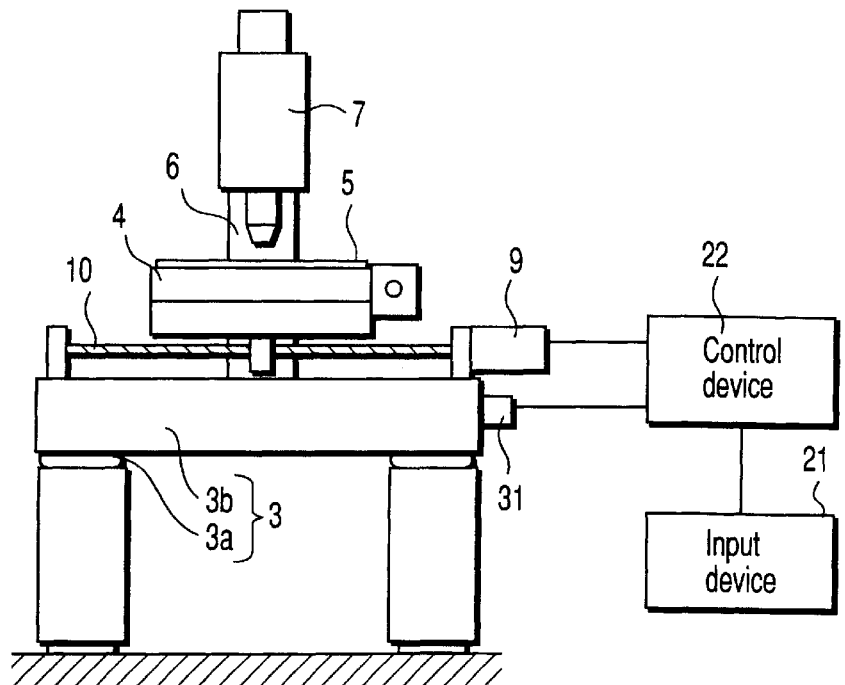
Figure 11:
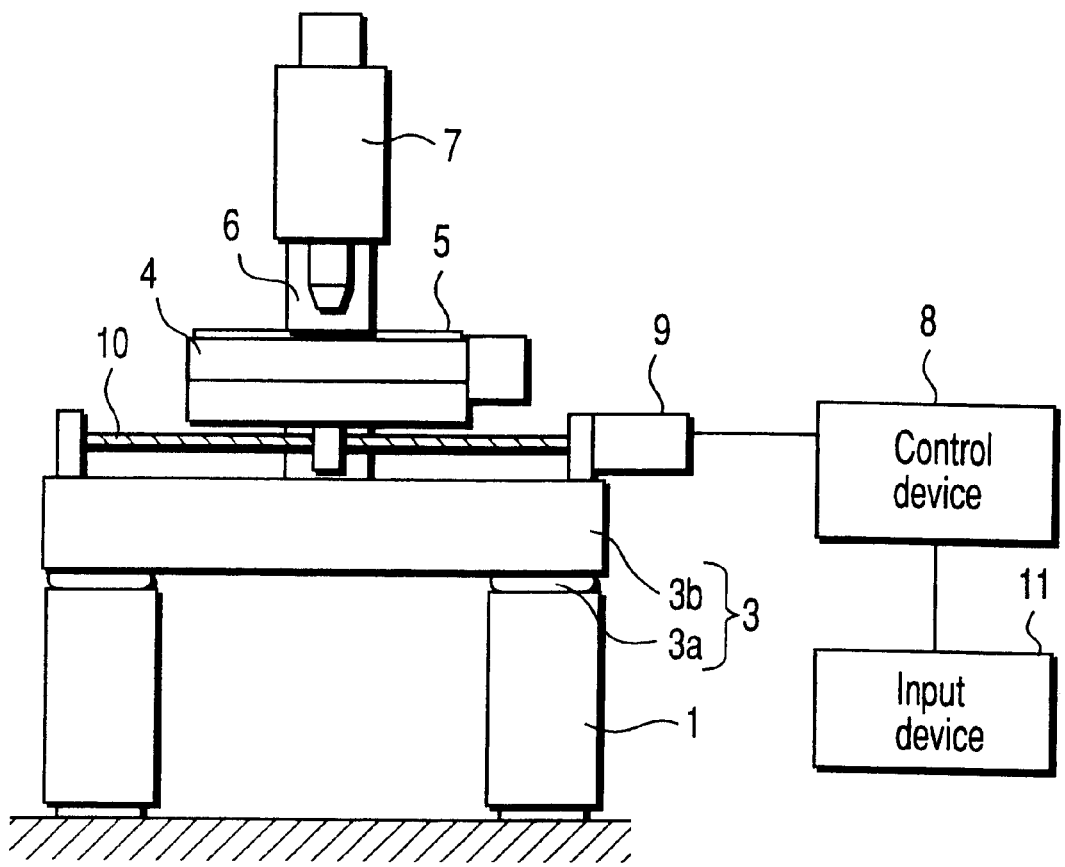

FIG. 1 is a diagram schematically showing a structure of the stage apparatus according to the first to third embodiments of the present invention;

FIG. 2 is a flowchart illustrating the operation of the apparatus according to the first embodiment of the present invention;

FIG. 3 is a diagram showing waveforms illustrating the operation of the apparatus according to the first embodiment of the present invention;

FIG. 4 is another diagram showing waveforms illustrating the operation of the apparatus according to the first embodiment of the present invention;

FIG. 5 is a flowchart illustrating the operation of the apparatus according to the second embodiment of the present invention;

FIG. 6 is a diagram showing waveforms illustrating the operation of the apparatus according to the second embodiment of the present invention;

FIG. 7 is a flowchart illustrating the operation of the apparatus according to the third embodiment of the present invention;

FIG. 8 is a diagram showing waveforms illustrating the operation of the apparatus according to the third embodiment of the present invention;

FIG. 9 is a diagram schematically showing a structure of the stage apparatus according to the fourth embodiment of the present invention;

FIG. 10 is a diagram schematically showing a structure of the stage apparatus according to the fifth embodiment of the present invention; and FIG. 11 is a diagram schematically showing an example of the conventional stage apparatus.

DETAILED DESCRIPTION OF THE INVENTION

Embodiments of the present invention will now be described with reference to accompanying drawings.

FIG. 1 is a diagram schematically showing a structure of the stage apparatus according to the first embodiment of the present invention. In FIG. 1, the same structural elements as shown in FIG. 11 are designated by the same reference numerals.

In FIG. 1, through an input device 11, a target movement amount of a stage 4 are inputted as input data, and then the input device 11 outputs them to a control device 8. As the input device 11, for example, a device which manually input a target movement amount or a pre-programmed computer, is used.

The control device 8, although it is not particularly limited, is made of, for example, a computer, and serves to control the driver of the servo motor, which is an acceleration/deceleration device 9. Further, the control device 8 calculates the degree of the acceleration of the stage 4 when the target movement amount for the stage 4 is input thereto from the input device 11.

It should be noted here that the movement amount of the stage 4 in the case where a deceleration signal is output n×T seconds after a predetermined acceleration signal is output (where the deceleration signal has the same waveform as that of the acceleration signal and an opposite direction to that of the acceleration signal), has been examined by calculation or actual measurement in advance. Here, n represents a natural number and T represents a rolling oscillation period (in seconds) unique to the vibration isolation table 3. In a practical case where a target movement amount D1 for the stage 4 is input from the input device 11, the acceleration signal (acceleration signal) A1 of the stage 4 is obtained by the control device 8 on the basis of the following formula (1):

$$A1 = (D1/D0) \times A0 \qquad (1)$$

where A0 indicates the degree of the predetermined acceleration signal and D0 indicates the actual movement amount of the stage 4.

In the above formula (1), D0 and A0 are values that have been obtained in advance and stored in the control device 8. A1 is a value indicating the acceleration speed. D1 is a value indicating the movement amount in the case where the stage is accelerated or deceleration with a particular acceleration signal waveform having the degree of A1, and then moved at a constant speed for T seconds.

The operation of the stage apparatus having the above-described structure will now be described with reference to the flowchart shown in FIG. 2 as well as FIGS. 3(A) to 3(F), which illustrate waveforms regarding the stage 4 and the vibration isolation table 3.

First, in step S101, when a target movement amount D1 for the stage 4 is input from the input device 11, the control device 8 obtains by calculation an acceleration signal A1 for the stage 4 using the above-mentioned formula (1) in step S201. FIG. 3(A') is a diagram showing an enlarged view of the acceleration signal A1. The acceleration signal A1 is given from the control device 8 to the acceleration/deceleration device 9 at a timing indicated by FIG. 3(A) in step S202. In this manner, the stage 4 is accelerated as illustrated in FIG. 3(B), and moved as illustrated in FIG. 3(C) in step S301.

As the stage 4 starts to accelerate based on the acceleration signal A1, the vibration isolation table 3 starts to roll due to the stress caused by the acceleration as shown in FIG. 3(D), and then is accelerated as shown in FIG. 3(E). Here, the rolling of the vibration isolation table 3 is at a rolling oscillation period T, which is unique to this table.

After that, n×T seconds after (here, n=1 and T seconds later) the output of the acceleration signal A1 in step S203, as shown in FIG. 3(A), a deceleration signal A1' having the same waveform as that of the acceleration signal A1 but in an inverse direction thereto, is output from the control device 8 to the acceleration/deceleration device 9 in step S204. Then, in step S302, the stage 4 starts to decelerate; however the deceleration signal A1' has the same waveform as but in an inverse direction to that of the acceleration signal A1, and therefore the stage 4 is brought to a stop as shown in FIG. 3(B) in step S303.

On the other hand, due to the deceleration of the stage 4, a stress is applied to the vibration isolation table 3. The timing when this stress is applied is that the momentum of the vibration isolation table 3 takes a maximum peak value A2 which is in an opposite direction to the movement of the stage 4 as can be seen in FIG. 3(F). Thus, the momentum of the vibration isolation table 3 is effectively canceled out by the stress created when the stage 4 is decelerated, and therefore the rolling can be suppressed as shown in FIG. 3(D).

It should be noted here that FIGS. 4(A) to 4(F) illustrate waveforms regarding the stage 4 and the vibration isolation table 3 in the case where the present invention is not employed. These figures correspond to FIGS. 3(A) to 3(F), respectively. In particular, from comparison between FIG. 3(D) and FIG. 4(D), it can be well understood that the rolling of the vibration isolation table 3 is drastically suppressed by the present invention.

According to the first embodiment, only by inputting a target movement amount for the stage 4 through the input device 11 as input data, an acceleration signal is output from the control device 8 to the acceleration/deceleration device 9 on the basis of the input data, and then n×T seconds after the output of the acceleration signal, a deceleration signal having the same waveform as that of the acceleration signal and an opposite direction to that, is output. In this manner, the momentum of the vibration isolation table 3 is effectively canceled out by the stress created when the stage 4 is decelerated, and therefore the rolling of the vibration isolation table can be effectively suppressed.

Next, the second embodiment of the present invention will now be described. The schematic structure of the stage apparatus here is similar to that of FIG. 1 and therefore this figure will be referred to in the following explanation.

The input device 11 is supposed to be a device which can move the stage 4 with a joystick or button. In the case where the input device 11 is, for example, a button type, it can have a such a function that when the button is pressed, the stage 4 starts to move, whereas when the button is released, the movement of the stage 4 is stopped. Such a button operation is given to the control device 8 as a start signal for the acceleration or deceleration.

Further, when the button of the input device 11 is pressed, the control device 8 raises an input signal, and also generates a pulse of a rolling oscillation period T of the vibration isolation table 3 based on the rise of the input signal taken as a trigger. After that, when the button of the input device 11 is released, the control device 8 falls the input signal.

The operation of the stage apparatus having the above-described structure will now be described with reference to the flowchart shown in FIG. 5 as well as the waveforms regarding the stage 4 and the vibration isolation table 3 illustrated in FIGS. 6(A) to 6(F).

First, as the button of the input device 11 is pressed in step S111, the control device 8 raises an input signal B1 as shown in FIG. 6(A) in step S211 and also generates a pulse B2 of a rolling oscillation period T of the vibration isolation table 3 as shown in FIG. 6(B) based on the rise of the input signal taken as a trigger. At the same time, the control device 8 outputs an acceleration signal B3 as shown in FIG. 6(C). Thus, the acceleration of the stage 4 is started in step S311.

While in the above-described state, when the button of the input device 11 is released in step S112, the input signal B1 is fallen as shown in FIG. 6(A). Then, in step S212, the control device 8 triggers at such a timing that the pulse B2 rises for the first time after the fall of the input signal B1 is triggered, and thus outputs a deceleration signal B4 as shown in FIG. 6(C). After that, in step S213, the control device 8 stops the generation of the pulse signal B2.

In this manner, n×T seconds after the output of the acceleration signal B3, a deceleration signal B4 is output and the stage 4 starts to decelerate in step S312. The deceleration signal B3 has the same waveform as but in an inverse direction to that of the acceleration signal B3, and it is output when the momentum of the vibration isolation table 3 takes a maximum peak value B5 which is in an opposite direction to the movement of the stage 4 as can be seen in FIG. 6(F). Thus, the momentum of the stage 4 is effectively canceled out by the stress created when the stage 4 is decelerated, and the stage 4 is put into a stop in step S313. In this case, as shown in FIG. 6(D), the rolling of the vibration isolation table 3 can be suppressed effectively as compared to the conventional case indicated by broken line, in which the present invention is not employed.

According to the second embodiment, the rolling of the vibration isolation table 3 can be suppressed effectively when the stage 4 is moved using a joystick or button as the input device 11.

Next, the third embodiment of the present invention will now be described. The schematic structure of the stage apparatus here is similar to that of FIG. 1 and therefore this figure will be referred to in the following explanation.

Here, the input device 11 is designed to input a target movement speed of the stage 4 as input data, and it is used to move the stage 4 at a constant speed. More specifically, the input device 11 is used to move the stage 4 over a long stroke at a constant speed for the case where an object 5 to be tested on the stage 4 is to be observed and measured.

The operation of the stage apparatus having the above-described structure will now be described with reference to the flowchart shown in FIG. 7 as well as the waveforms regarding the stage 4 and the vibration isolation table 3 illustrated in FIGS. 8(A) to 8(F).

First, as a target movement speed for the stage 4 is input from the input device 11 in step S121, the control device 8 calculates the size (amplitude) of the acceleration signal of the stage 4 in step S221. This calculation is conducted in the same manner as in the first embodiment. More specifically, a speed which can be reached as the stage 4 is accelerated by a predetermined acceleration waveform is obtained in advance by calculation or actual measurement, and thus obtained value is stored as a reference value for calculation. The size of an acceleration waveform actually required can be calculated out by multiplying the [rate of the target movement speed with respect to the reached speed in a predetermined acceleration waveform] with the [size of a predetermined acceleration waveform]. Further, the target movement speed of the stage 4 in this case, is set to be obtained by accelerating two times by an acceleration signal having the same waveform, as shown in FIG. 8(A), and the size of the acceleration signal is set to be just necessary to accelerate the stage up to a half speed of the target movement speed.

From the above-described state, the control device 8 outputs the first acceleration signal C1 used to accelerate the stage up to a half speed of the target movement speed in step S222, and then the stage 4 is accelerated to a half speed of the target movement speed in step S321 as shown in FIG. 8(B). Then, (0.5−n)×T seconds after the output of the first acceleration signal C1 in step S223, the control device 8 outputs a second acceleration signal C2 having the same waveform as that of the first acceleration signal C1 in step S224. With the second acceleration signal C2, the stage 4 is further accelerated in step S322, and reaches the target movement speed. After that, in step S323, the stage 4 is moved at constant speed.

In this case, when the stage 4 is accelerated with the first acceleration signal C1, the vibration isolation table 3 starts to roll due to the stress of the acceleration as shown in FIG. 8(C). Then, (n−0.5)×T seconds (that is, in FIG. 8, 0.5T seconds later for n=1) after the output of the first acceleration signal C1, a second acceleration signal C2 is output. The second acceleration signal C2 is output when the momentum of the vibration isolation table 3 takes a maximum peak value C3 which is in the same direction as that of the movement of the stage 4 as can be seen in FIG. 8(E). Thus, the momentum of the vibration isolation table 3 is canceled out by the stress created due to the second acceleration signal C2, and therefore the rolling of the vibration isolation table 3 can be suppressed effectively as compared to the conventional case indicated by a broken line, and in which the present invention is not employed, as can be seen in FIG. 8(C).

According to the third embodiment, the rolling of the vibration isolation table 3 can be suppressed effectively even in the case the stage 4 is moved at a constant speed as a target movement speed for the stage 4 is input from the input device 11.

Next, the fourth embodiment of the present invention will now be described. It should be noted here that the first to third embodiments were described above taking examples where the rolling oscillation period T of the vibration isolation table 3 is known. However, according to the fourth embodiment, there is provided a stage apparatus which can adjust the rolling oscillation period T manually when the rolling oscillation period T of the vibration isolation table 3 is not known.

FIG. 9 is a diagram schematically showing a structure of the stage apparatus according to the fourth embodiment of the present invention. In FIG. 9, the same structural elements as shown in FIG. 1 or 11 are designated by the same reference numerals.

In FIG. 9, through an input device 21, a target movement amount of a stage 4 are input as input data, and then the input device outputs them to a control device 22. As the input device 21, an arbitrary device having such a function that a target movement amount can be input and then it can be output to the control device 22, will do. Here, for example, a manual device with which a target movement amount can be input, or a pre-programmed computer, can be used as the input device.

The control device 22, although it is not particularly limited, is made of, for example, a computer and serves to control the driver of the servo motor, which is an acceleration/deceleration device 9. Further, the control device 22 handles a variable Tc which corresponds to the rolling oscillation period T of the vibration isolation stage 3, which can be changed from outside.

An adjustment device 23 is connected to the control device 22. The adjustment device 23 serves to manually and arbitrarily change the variable Tc of the control device 22, which corresponds to the rolling oscillation period T of the vibration isolation table 3, which is not known then. Further, a CCD camera 24 is provided for the microscope 7, and an observation image of an object to be tested, taken via the microscope 7 is picked up by the CCD camera 24, and then displayed on a monitor 25.

In the stage apparatus having the above-described structure, as the stage 4 is driven based on the variable Tc set in the control device 22, taken as the rolling oscillation period T of the vibration isolation stage 3, the vibration isolation stage 3 is rolled and oscillated as the stage 4 is driven. Accordingly, the oscillation is propagated to the microscope 7 from the stage 4 and therefore the observation image displayed on the monitor 25 is oscillated as well.

The observer, while monitoring the oscillation state of the observation image displayed on the monitor 25, is supposed to adjust the variable Tc set in the control device 22 to set the optimal variable Tc that can minimize the oscillation. Then, the control device 22 takes thus set viable Tc as the rolling oscillation period T of the vibration isolation table 3, and controls the stage 4 as in the first to third embodiments described above.

Here, the observer is supposed to adjust the variable Tc set in the control device 22 while monitoring the oscillation state of the observation image; however it is alternatively possible that a vibration meter, not shown, is provided for the vibration isolation table 3 and the variable is adjusted while monitoring the vibration waveform indicated by the vibration meter.

According to the fourth embodiment, even if the rolling oscillation period T of the vibration isolation table 3 is not known, it is still possible for the observer to assign the optimal variable Tc adjusting the variable Tc set in the control device 22 while monitoring the oscillation of the microscopic observation image. Therefore, the rolling of the vibration isolation table 3 can be effectively suppressed.

Next, the fifth embodiment of the present invention will now be described. It should be noted here that the first to third embodiments were described above taking examples where the rolling oscillation period T of the vibration isolation table 3 is known, and the fourth embodiment was described by taking an example the rolling oscillation period T can be manually input still when the rolling oscillation period T is not known. However, according to the fifth embodiment, there is provided a stage apparatus which can adjust the rolling oscillation period T automatically when the rolling oscillation period T of the vibration isolation table 3 is not known.

FIG. 10 is a diagram schematically showing a structure of the stage apparatus according to the fifth embodiment of the present invention. In FIG. 10, the same structural elements as shown in FIG. 9 are designated by the same reference numerals.

In FIG. 10, through an input device 21, a target movement amount of a stage 4 is input as input data, and then the device outputs it to a control device 22. As the input device 21, an arbitrary device having such a function that a target movement amount can be input and then it can be output to the control device 22, will do. Here, for example, a manual device with which a target movement amount can be input, or a pre-programmed computer, can be used as the input device.

A vibration meter 31 is mounted on the vibration isolation table 3 which supports the stage 4. The vibration meter 31 serves to detect the rolling oscillation of the vibration isolation table 3. In other words, the vibration meter 31 detects the rolling oscillation of the vibration isolation table 3, and outputs an oscillation signal to the control device 22.

The control device 22, although it is not particularly limited, includes, for example, a computer and serves to control the driver of the servo motor, which is an acceleration/deceleration device 9. Further, the control device 22 handles a variable Tc which corresponds to the rolling oscillation period T of the vibration isolation stage 3, which can be changed from outside. The variable Tc can be adjusted here with a signal equivalent to an oscillation amplitude detected by the vibration meter 31.

In the stage apparatus having the above-described structure, as the stage 4 is driven-based on the variable Tc set in the control device 22, taken as the rolling oscillation period T of the vibration isolation stage 3, the vibration isolation stage 3 is rolled and oscillated as the stage 4 is driven, and the oscillation amplitude here is detected by the vibration meter 31. Then, the signal indicating the oscillation amplitude detected by the vibration detector 31 is taken in the control device 22 from the vibration meter 31, the control device 22 revise the variable Tc. Then, while varying the variable Tc, the control device 22 takes in further oscillation amplitude signals to find out such a variable Tc that the oscillation amplitude becomes minimum. Eventually, the control device 22 takes thus found viable Tc as the rolling oscillation period T of the vibration isolation table 3, and controls the stage 4 as in the first to third embodiments described above.

According to the fifth embodiment, even if the rolling oscillation period T of the vibration isolation table 3 is not known, it is still possible to adjust the variable Tc set in the control device 22 to the optimal variable Tc in accordance with the oscillation amplitude output from the vibration meter 31. Therefore, the rolling of the vibration isolation table 3 can be effectively suppressed.

That is, with the invention, it is possible to effectively suppress the rolling of the vibration isolation table while moving the stage based on a target movement amount input via the input means.

Further, with the invention, it is possible to effectively suppress the rolling of the vibration isolation table while moving the stage.

Furthermore, with the invention, it is possible to effectively suppress the rolling of the vibration isolation table while moving the stage at a constant speed based on a target movement speed input via the input means.

Furthermore, with the invention, it is possible to effectively suppress the rolling of the vibration isolation table even in the case where the rolling oscillation period unique to the vibration isolation table is not known, since the apparatus can be set in an optimal state from outside.

Furthermore, with the invention, it is possible to effectively suppress the rolling of the vibration isolation table since the variable Tc can be adjusted to an optimal value.

It should be noted here that the present invention is not limited to the above-described embodiments; but it can be realized in various modifications as long as the essence of the invention falls in its scope.

As described above, according to the present invention, there is provided a stage apparatus which can effectively suppress rolling of the vibration isolation table, which is caused by a stress created as the stage is accelerated or decelerated.

What is claimed is:

1. A stage apparatus including a stage mounted on a vibration isolation table, said stage apparatus comprising:
   a drive unit which accelerates or decelerates said stage;
   an input unit which accepts a start signal of acceleration/deceleration as input data without defining a target movement amount for said stage; and
   a control unit which outputs an acceleration signal to said drive unit based on the data input to said input unit, and which outputs a deceleration signal n×T seconds after said acceleration signal is output, wherein n represents a natural number and T represents a rolling oscillation period unique to the vibration isolation table (in seconds), and wherein the deceleration signal has a same waveform as said acceleration signal and an opposite direction to said acceleration signal.

2. A stage apparatus according to claim 1, wherein said input unit is a joystick or a button switch.

3. A stage apparatus according to claim 2, wherein said control unit varies a variable Tc equivalent to the rolling oscillation period T unique to said vibration isolation table from outside, and controls said drive unit based on the variable Tc taken as the rolling oscillation period T unique to said vibration isolation table.

4. A stage apparatus according to claim 1, wherein said control unit varies a variable Tc equivalent to the rolling oscillation period T unique to said vibration isolation table from outside, and controls said drive unit based on the variable Tc taken as the rolling oscillation period T unique to said vibration isolation table.

5. A stage apparatus according to claim 4, further comprising: a detection unit which detects the rolling oscillation of said vibration isolation table,
   wherein said control unit adjusts the variable Tc in accordance with the oscillation amplitude detected by said detection unit.

6. A stage apparatus including a stage mounted on a vibration isolation table, comprising:
   a drive unit which accelerates or decelerates said stage;
   an input unit which accepts a target movement speed for said stage as input data; and
   a control unit which outputs a first acceleration signal to said drive unit based on the input contents to said input unit and outputs, (n−0.5)×T seconds after the first acceleration signal is output (where n represents a natural number and T represents a rolling oscillation period unique to the vibration isolation table [in seconds]), a second acceleration signal having a same waveform as that of the first acceleration signal and a same direction thereto.

7. A stage apparatus according to claim 3, wherein said control unit varies a variable Tc equivalent to the rolling oscillation period T unique to said vibration isolation table from outside, and controls said drive unit based on the variable Tc taken as the rolling oscillation period T unique to said vibration isolation table.

* * * * *